United States Patent
Nakayama

(10) Patent No.: US 10,089,564 B2
(45) Date of Patent: Oct. 2, 2018

(54) IMAGE FORMING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Fumiharu Nakayama, Yokohama Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/018,979

(22) Filed: Feb. 9, 2016

(65) Prior Publication Data

US 2017/0228624 A1     Aug. 10, 2017

(51) Int. Cl.
G06F 3/12 (2006.01)
G06K 15/00 (2006.01)
(Continued)

(52) U.S. Cl.
CPC ............ G06K 15/4055 (2013.01); G01S 1/08 (2013.01); G06F 3/1211 (2013.01);
(Continued)

(58) Field of Classification Search
CPC ....... G06F 3/121; G06F 3/1234; G06F 3/1262
(Continued)

(56) References Cited

U.S. PATENT DOCUMENTS 8,144,685 B2 * 3/2012 Sakoda ................. H04W 48/08
370/348
8,687,214 B2 4/2014 Kurahashi
(Continued)

FOREIGN PATENT DOCUMENTS

JP 2008-283578 11/2008
JP 2012-037986 2/2012
(Continued)

OTHER PUBLICATIONS

Extended European Search Report for European Patent Application No. 17154526.2 dated Apr. 26, 2017.

*Primary Examiner* — Neil R McLean
*Assistant Examiner* — Darryl V Dottin
(74) *Attorney, Agent, or Firm* — Amin, Turocy & Watson LLP

(57) ABSTRACT

A portable terminal comprises an ID acquisition section, a position information acquisition section and a return instruction section. The ID acquisition section acquires ID information that specifies a print job sent from an information processing apparatus to an image forming apparatus. In a case in which the ID information is acquired and a beacon signal is received from a beacon transmitter, the position information acquisition section acquires, according to the received beacon information, position information relating to a position of the portable terminal relative to the image forming apparatus. If the position information meets a specific condition indicating the approach of the portable terminal to the image forming apparatus, the return instruction section instructs the image forming apparatus to return from a power-saving mode to a normal mode.

5 Claims, 6 Drawing Sheets

(51) Int. Cl.
  *G01S 1/08* (2006.01)
  *H04N 1/00* (2006.01)
  *H04N 1/32* (2006.01)
(52) U.S. Cl.
  CPC .......... *G06F 3/1231* (2013.01); *G06F 3/1292* (2013.01); *H04N 1/00307* (2013.01); *H04N 1/00342* (2013.01); *H04N 1/32117* (2013.01); *H04N 2201/006* (2013.01); *H04N 2201/0075* (2013.01); *H04N 2201/0094* (2013.01); *H04N 2201/3221* (2013.01)
(58) Field of Classification Search
  USPC ........................................................ 358/1.16
  See application file for complete search history.

(56) References Cited

U.S. PATENT DOCUMENTS

| | | | |
|---|---|---|---|
| 9,116,652 B2* | 8/2015 | Yun | G06F 3/1438 |
| 2002/0054330 A1* | 5/2002 | Jinbo | G06F 3/1221 |
| | | | 358/1.15 |
| 2009/0284790 A1 | 11/2009 | Ohashi | |
| 2012/0033245 A1 | 2/2012 | Kurahashi | |
| 2013/0222840 A1 | 8/2013 | Hosoda | |
| 2013/0250358 A1* | 9/2013 | Suzuki | H04L 65/1069 |
| | | | 358/1.15 |
| 2015/0264569 A1* | 9/2015 | Toyota | H04W 12/06 |
| | | | 726/7 |
| 2015/0381669 A1 | 12/2015 | Hirabayashi | |
| 2017/0134606 A1* | 5/2017 | Kim | H04N 1/32117 |

FOREIGN PATENT DOCUMENTS

| | | |
|---|---|---|
| JP | 2015-166909 | 9/2015 |
| WO | 2016/003108 | 1/2016 |

* cited by examiner

1

IMAGE FORMING METHOD

FIELD

Embodiments described herein relate generally to a portable terminal.

BACKGROUND

In recent years, a technology is known which is used for an MFP (Multi-Function Peripheral) in a power-saving mode to return from the power-saving mode when the MFP senses an approaching user. As it takes the MFP several to dozens of seconds to return from the power-saving mode to a normal mode, the technology is developed for the MFP to start returning from the power-saving mode before the MFP is operated by a user. As a method for sensing an approaching user, the image of a user who approaches an MFP is recognized by photographing the surroundings of the MFP with the use of a camera. However, restricted by the orientation of the camera and the range of image recognition, in some cases, the approach of a user cannot be highly accurately sensed with the use of the method.

DETAILED DESCRIPTION

In accordance with an embodiment, a portable terminal comprises an ID acquisition section, a position information acquisition section and a return instruction section. The ID acquisition section acquires ID information that specifies a print job sent from an information processing apparatus to an image forming apparatus. In a case in which the ID information is acquired by the ID acquisition section and a beacon signal is received from a beacon transmitter located nearby the image forming apparatus, the position information acquisition section acquires, according to the received beacon information, position information relating to a position of the portable terminal relative to the image forming apparatus. If the position information acquired by the position information acquisition section meets a specific condition indicating the approach of the portable terminal to the image forming apparatus, the return instruction section instructs the image forming apparatus to return from a power-saving mode to a normal mode.

The image forming apparatus of the embodiment is described below with reference to the accompanying drawings.

Figure 1:
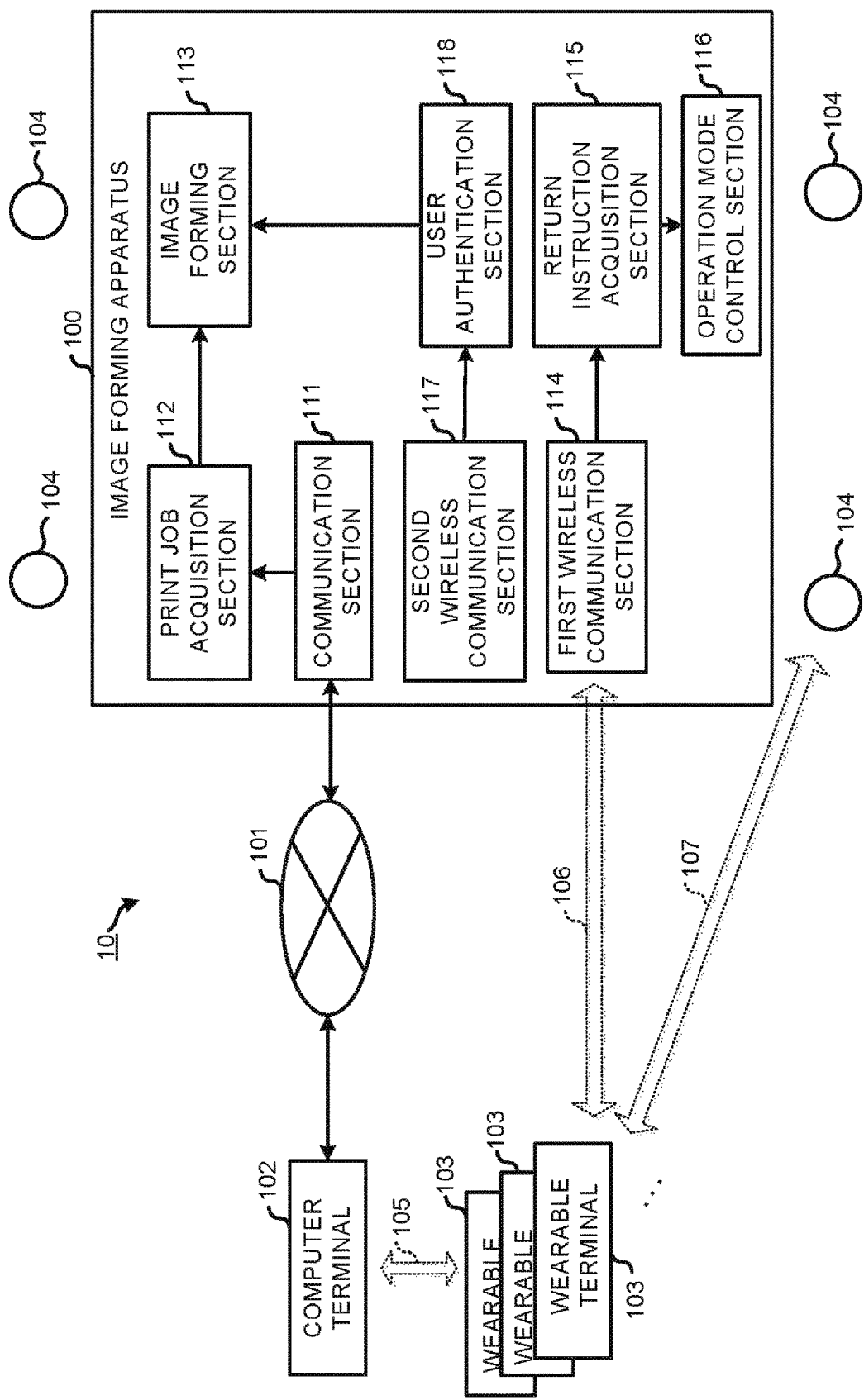
FIG. 1 is a diagram exemplifying the overall structure of an image forming apparatus control system 10 according to an embodiment.

FIG. 1 is a diagram exemplifying the overall structure of an image forming apparatus control system 10 according to the embodiment. The image forming apparatus control system 10 comprises an image forming apparatus 100, a network 101, a computer terminal (information processing apparatus) 102, a wearable terminal (portable terminal) 103 and beacon transmitters 104.

The image forming apparatus 100 is, for example, a digital multi-function peripheral. The network 101 is a communication network such as an in-house LAN (Local Area Network) or a wireless LAN. The computer terminal 102 is, for example, a personal computer. Although not shown in FIG. 1, an input section including a mouse and a keyboard, a display section such as a liquid crystal display, a wireless communication section for conducting a short distance wireless communication in accordance with a standard such as Bluetooth and a communication section for communicating via the network 101 are arranged in the computer terminal 102. The computer terminal 102 outputs a print job to the image forming apparatus 100 via the network 101.

The wearable terminal 103 is, for example, a wristwatch-type terminal that is worn on the wrist of a user. The wearable terminal 103 has a function of conducting first short distance wireless communication 105 with the computer terminal 102. The wearable terminal 103 has a function of conducting first short distance wireless communication 106 with the image forming apparatus 100. The wearable terminal 103 has a function of conducting first short distance wireless communication 107 with the beacon transmitter 104. The first short distance wireless communication 105-107 is, for example, wireless communication conducted in accordance with a standard such as Bluetooth. The wearable terminal 103 has a function of acquiring a document ID for specifying a print job from the computer terminal 102. The wearable terminal 103, by being held over (approaching) a specific position of the image forming apparatus 100, has a function of conducting second short distance wireless communication for the user to be authenticated by the image forming apparatus 100. The second short distance wireless communication is a wireless communication conducted in accordance with a NFC (Near Field Communication) standard.

A plurality of beacon transmitters 104 is arranged around the image forming apparatus 100 to send beacon signals. The wearable terminal 103 has a function of acquiring, according to a beacon signal sent from a beacon transmitter 104, position information relating to a position of the wearable terminal 103 relative to the image forming apparatus 100. The wearable terminal 103 has a function of outputting a return instruction on the return from a power-saving mode to a normal mode if the acquired position information meets a specific condition indicating the approach of the wearable terminal 103 to the image forming apparatus 100.

The image forming apparatus 100 comprises a communication section 111, a print job acquisition section 112, an image forming section 113, a first wireless communication section 114, a return instruction acquisition section 115, an operation mode control section 116, a second wireless communication section 117 and a user authentication section 118.

The image forming apparatus 100 has two operation modes: a normal mode and a power-saving mode in which less power is consumed when compared with in the normal mode. In the normal mode, each section in the image forming apparatus 100 is powered on so that a response to the formation of an image is made in a short time according to an operation of the user. In the power-saving mode, only a part of the sections in the image forming apparatus 100 are powered on, thus reducing power consumption. It takes the image forming apparatus 100 several to dozens of seconds to return from the power-saving mode to the normal mode. For example, it takes the image forming apparatus 100 which fixes a toner image thermally several to dozens of seconds to obtain a temperature needed for a heating processing.

The communication section 111 communicates in a specific communication way via the network 101. The print job acquisition section 112 acquires a print job from the computer terminal 102 via the network 101 and the communication section 111. The print job acquisition section 112 has a function of keeping the acquired print job until a specific period of time elapses from the acquisition of the print job or until a specific condition for managing the print job is met.

The image forming section 113 forms an image on a sheet according to the print job acquired by the print job acquisition section 112. The first wireless communication section 114 conducts the short distance wireless communication 106 with the wearable terminal 103. The return instruction acquisition section 115 acquires a return instruction on the return from the power-saving mode to the normal mode from the wearable terminal 103 via the first wireless communication section 114.

The operation mode control section 116 causes the operation mode of image forming apparatus 100 to return from the power-saving mode to the normal mode according to the return instruction acquired by the return instruction acquisition section 115. The second wireless communication section 117 is, for example, a communication section conducting a short distance wireless communication in accordance with a NFC (Near Field Communication) standard. In the image forming apparatus 100, the second wireless communication section 117 is arranged at a specific position over which the wearable terminal 103 worn on the wrist of the user can be held easily.

The user authentication section 118 acquires, via the second wireless communication section 117, authentication information needed for the user authentication through the wearable terminal 103 and a document ID. The user authentication section 118 authenticates the user according to the acquired authentication information. The user authentication section 118 outputs the acquired document ID, together with the authenticated authentication information, to the image forming section 113. The image forming section 113 receives, through the print job acquisition section 112, a print job corresponding to the document ID sent from the user authentication section 118 to form an image.

With the foregoing structure, the image forming apparatus 100 can return from the power-saving mode when a user wearing the wearable terminal 103 in which a document ID is stored approaches. In a case in which the user makes the wearable terminal 103 in which the document ID is stored close to a specific position, the returned image forming apparatus 100 can acquire the authentication information of the user and the document ID from the wearable terminal 103. In this way, if the user can be authenticated according to the authentication information, the image forming apparatus 100 carries out an image forming processing according to a print job corresponding to the document ID.

Figure 2:
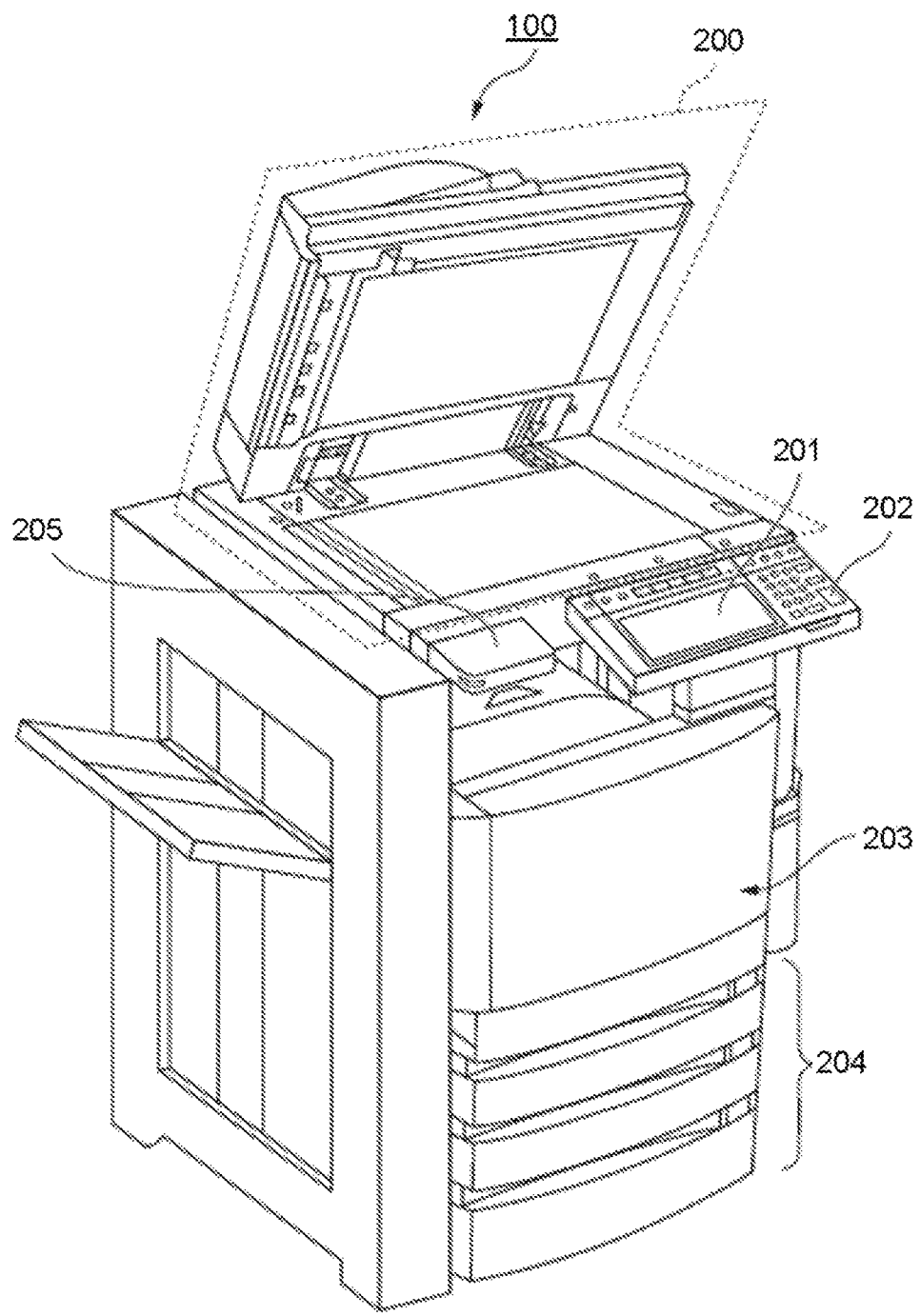
FIG. 2 is an external view exemplifying the overall structure of the image forming apparatus 100 according to the embodiment.

Next, the overall structure of the appearance of the image forming apparatus 100 of the embodiment is exemplified. FIG. 2 is an external view exemplifying the overall structure of the image forming apparatus 100 according to the embodiment. The image forming apparatus 100 comprises an image reading section 200, an operation display section 201, a control panel 202, a printer section 203, a sheet accommodation section 204 and an authentication communication section 205. The printer section 203 of the image forming apparatus 100 may be a device for fixing a toner image or an inkjet-type device.

The image forming apparatus 100 reads an image presented on a sheet to generate digital data, thereby generating an image file. The sheet refers to, for example, a document or a sheet on which characters and images are recorded. The sheet may be any object as long as it can be read by the image forming apparatus 100.

The operation display section 201 is an image display device such as a liquid crystal display or an organic EL (Electro Luminescence) display. The operation display section 201 displays various kinds of information relating to the image forming apparatus 100. The operation display section 201 also functions as a touch panel for receiving an operation of the user. The user can set the operation and the function of the image forming apparatus 100 by executing an input operation on the operation display section 201.

The control panel 202 is equipped with a plurality of buttons. The control panel 202 receives an operation of the user. The control panel 202 outputs a signal corresponding to an operation of the user to the control section of the image forming apparatus 100. The control panel 202 includes a button for instructing a scanner to start reading a document.

The printer section 203 comprises the image forming section 113 for forming an image on a sheet according to image information generated by the image reading section 200 or image information received through a communication path. The printer section 203 forms the image in the following way: the image forming section 113 of the printer section 203 forms an electrostatic latent image on a photoconductive drum according to the image information; the image forming section of the printer section 203 forms a visible image by attaching a developing agent to the electrostatic latent image, wherein toner is a specific example of the developing agent; the transfer section of the printer section 203 transfers the visible image onto a sheet; and the fixing section of the printer section 203 fixes the visible toner on the sheet by heating and pressing the sheet. The sheet on which the image is formed may be a sheet accommodated in the sheet accommodation section 204 or a manually fed sheet.

The sheet accommodation section 204 accommodates a sheet which is used in the printer section 203 for the formation of an image. The authentication communication section 205 is a specific position to which the wearable terminal 103 is close for user authentication. The second wireless communication section 117 is built in the authentication communication section 205. The second wireless communication section 117 communicates with the wearable terminal 103 which is within a certain distance (e.g. dozens of centimeters) from the authentication communication section 205.

The image reading section 200 reads the image information of a read object as light intensity. The image reading section 200 records the read image information. The recorded image information may be sent to another information processing apparatus via a network. The recorded image information may be used by the printer section 203 to form an image on a sheet.

Figure 3:
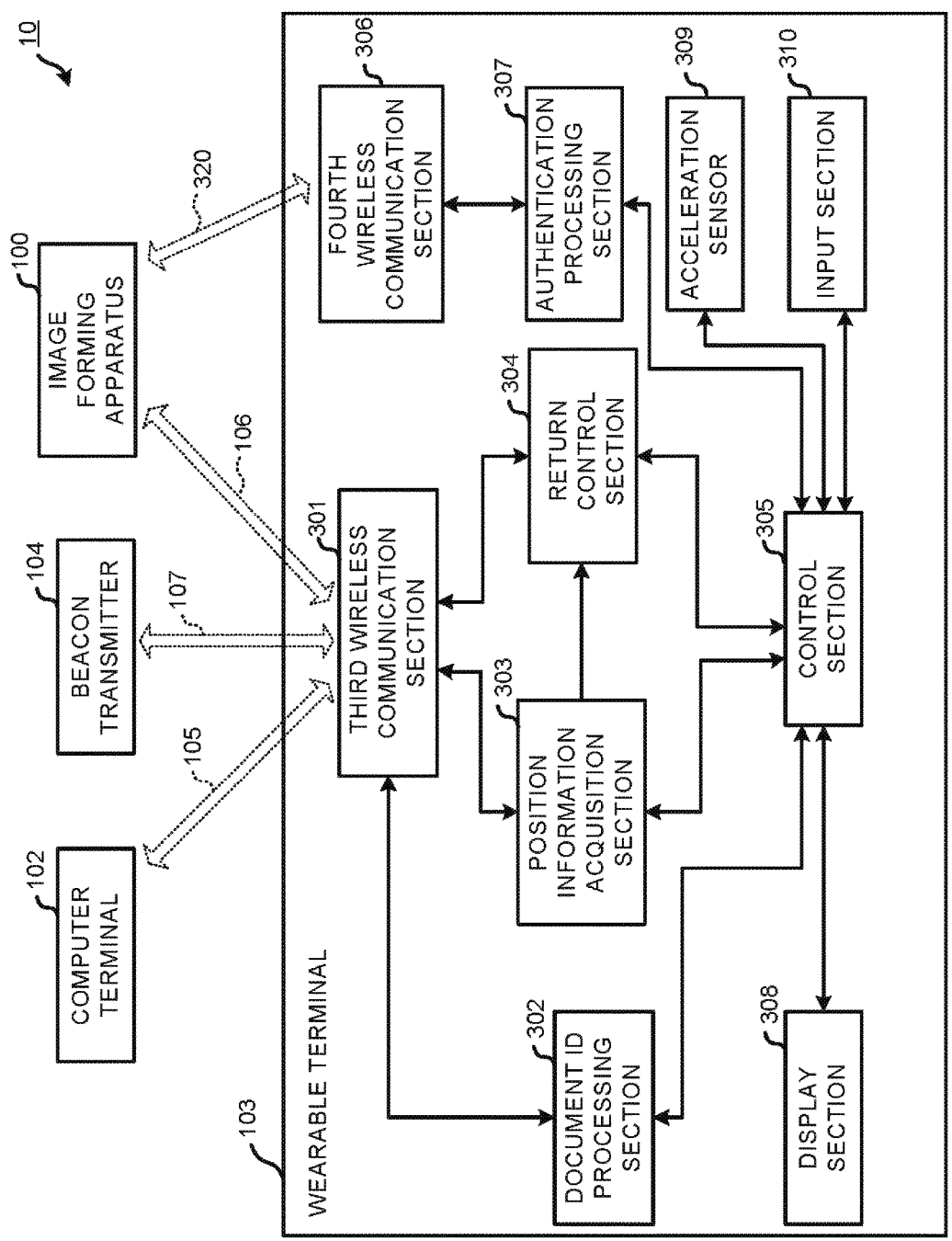
FIG. 3 is a schematic diagram exemplifying the structure of a wearable terminal 103.

FIG. 3 is a schematic diagram exemplifying the structure of the wearable terminal 103. The wearable terminal 103 comprises a third wireless communication section 301, a document ID processing section 302, a position information acquisition section 303, a return control section 304, a control section 305, a fourth wireless communication section 306, an authentication processing section 307, a display section 308, an acceleration sensor 309 and an input section 310.

The third wireless communication section 301 conducts first short distance wireless communication with the computer terminal 102, the image forming apparatus 100 and the beacon transmitter 104. The document ID processing section 302 receives a document ID for specifying a print job from the computer terminal 102 through the third wireless communication section 301. The position information acquisition section 303 receives a beacon signal from the beacon transmitter 104 via the third wireless communication section 301.

The position information acquisition section 303 acquires, according to the received beacon signal, position information relating to a position of the wearable terminal 103 relative to the image forming apparatus 100. The position information is acquired based on the beacon signal with the use of a well-known technology. The distance between the image forming apparatus 100 and the wearable terminal 103, the movement direction of the wearable terminal 103 and information indicating the approach of the wearable terminal 103 to the image forming apparatus 100 are contained in the position information.

The return control section 304 determines whether or not the position information acquired by the position information acquisition section 303 meets a specific condition indicating the approach of the wearable terminal 103 to the image forming apparatus 100. If the return control section 304 determines that the position information acquired by the position information acquisition section 303 meets the specific condition, then the return control section 304 outputs a return instruction to instruct the image forming apparatus 100 to return from the power-saving mode.

As a specific example, the return control section 304 sets the specific condition to be that the approaching wearable terminal 103 is within a given distance from the image forming apparatus 100. In this way, in a case in which it is determined that the approaching wearable terminal 103 is within a given distance from the image forming apparatus 100, the return control section 304 sends the return instruction for instructing return to the image forming apparatus 100 via the third wireless communication section 301, and in this way the first wireless communication section 114 of the image forming apparatus 100 receives the return instruction.

The control section 305 controls each section in the wearable terminal 103. The fourth wireless communication section 306 conducts second short distance wireless communication 320 with the second wireless communication section 117 of the image forming apparatus 100. The authentication processing section 307 sends authentication information needed for user authentication to the image forming apparatus 100 via the fourth wireless communication section 306. The authentication processing section 307 acquires a document ID from the document ID processing section 302 via the control section 305. The authentication processing section 307 associates the acquired document ID with the authentication information and sends the associated information to the image forming apparatus 100.

The display section 308 which is, for example, a liquid crystal device, displays various kinds of information relating to the wearable terminal 103. The acceleration sensor 309 detects the movement of the wearable terminal 103. For example, in a case of exchanging document IDs among a plurality of wearable terminals 103, a plurality of users vibrates the wearable terminals 103 up and down or from left to right or in other optional directions. If the vibration is detected by the acceleration sensor 309, then the control section 305 in each wearable terminal 103 carries out the following control: the wearable terminal 103 in which a document ID is stored sends the document ID to a wearable terminal 103 in which no document ID is stored. Further, the communication between the wearable terminals 103 may be carried out by the first short distance wireless communication with the use of the third wireless communication section 301.

The input section 301 consisting of buttons and the like receives an input from the user.

Although described in the present embodiment as a structure which sends a return instruction to the image forming apparatus 100 through the first short distance communication, the wearable terminal 103 is not limited to this. The wearable terminal 103 may also be, for example, a structure which sends a return instruction to the image forming apparatus 100 through a wireless LAN communication.

As a method for exchanging document IDs among a plurality of wearable terminals 103, a plurality of users vibrates the wearable terminals 103 up and down or from left to right or in other optional directions; however, document IDs are not limited to be exchanged in this way. The plurality of users may synchronously press a specific button arranged on the wearable terminals 103 to deliver document IDs among the plurality of wearable terminals 103.

Figure 4:
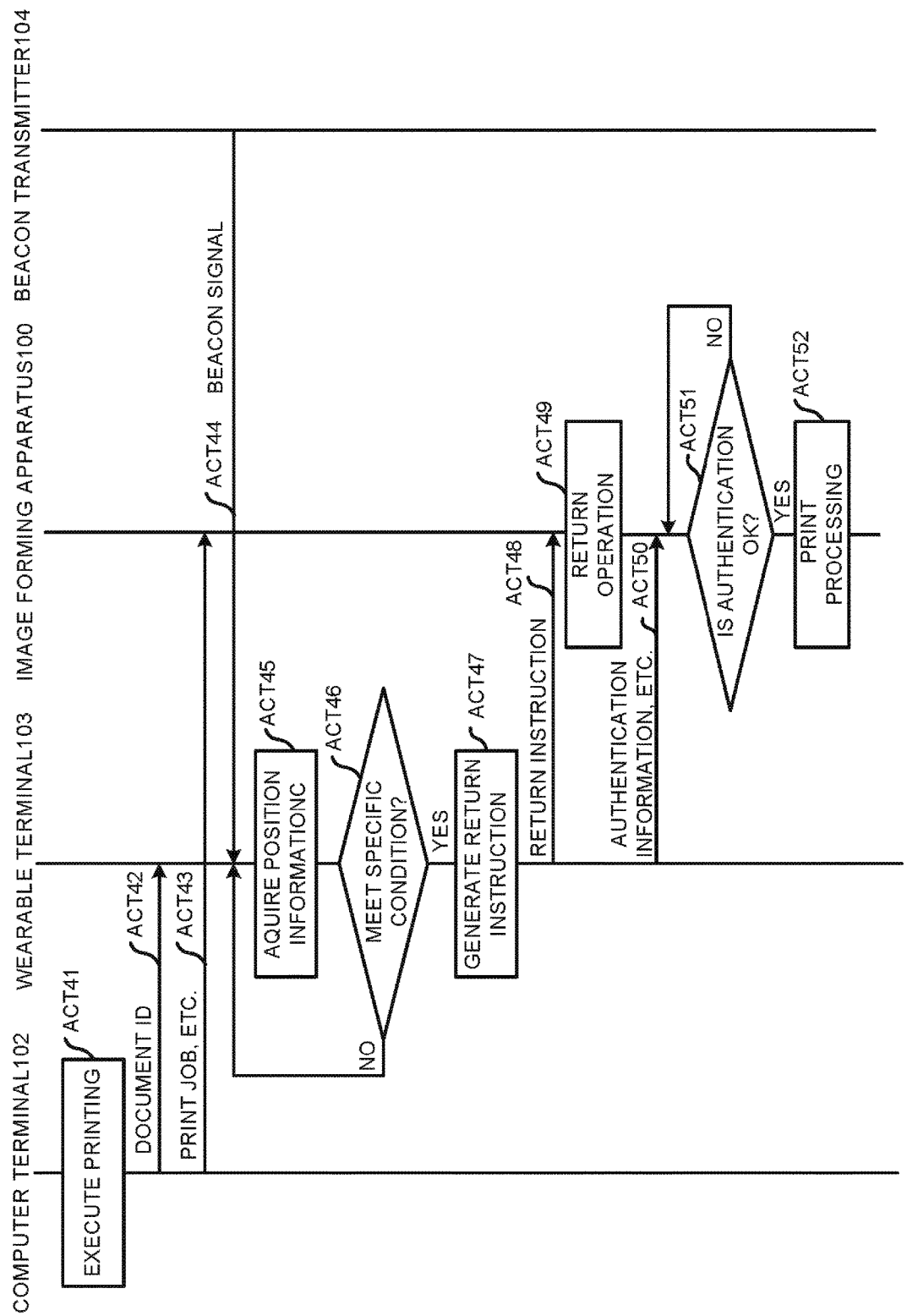
FIG. 4 is a flowchart exemplifying the operations of the image forming apparatus control system 10.

FIG. 4 is a flowchart exemplifying the operations of the image forming apparatus control system 10. Further, as a precondition for the operations shown in FIG. 4, the image forming apparatus 100 is in the state of a power-saving mode at the beginning. In the state of the power-saving mode, the image forming apparatus 100 can receive a print job from the computer terminal 102 and store the received print job.

A print processing is carried out in the computer terminal 102 (Act 41). The computer terminal 102 sends a document ID to the wearable terminal 103 (Act 42). The computer terminal 102 sends a print job and the document ID for specifying the print job to the image forming apparatus 100 (Act 43).

Herein, it is assumed that the user wearing the wearable terminal 103 in which the document ID is stored walks from the computer terminal 102 to the image forming apparatus 100. Thus, the wearable terminal 103 receives a beacon signal from the beacon transmitter 104 (Act 44). In this way, the wearable terminal 103 acquires, according to the received beacon signal, position information relating to a position of the wearable terminal 103 relative to the image forming apparatus 100 (Act 45).

The wearable terminal 103 determines whether or not the acquired position information meets a specific condition indicating the approach of the wearable terminal 103 to the image forming apparatus (Act 46). If the wearable terminal 103 determines that the acquired position information fails to meet the specific condition (Act 46: No), the wearable terminal 103 returns to the processing in Act 45 to acquire new position information.

If the wearable terminal 103 determines that the acquired position information meets the specific condition (Act 46: Yes), the wearable terminal 103 generates a return instruction for instructing the image forming apparatus 100 to return from the power-saving mode to a normal mode (Act 47). The wearable terminal 103 sends the generated return instruction to the image forming apparatus 100 (Act 48).

Then, the image forming apparatus 100 acquires the return instruction from the wearable terminal 103, changes the operation mode from the power-saving mode to the normal mode to carry out a return operation from the power-saving mode (Act 49). Herein, it is assumed that the user walks to the front of the returned image forming apparatus 100 and makes the wearable terminal 103 close to the authentication communication section 205. In this way, the wearable terminal 103 conducts the second short distance wireless communication 320 to associate the document ID with authentication information and then sends the associated information to the image forming apparatus 100 (Act 50).

The image forming apparatus 100 authenticates the user according to the acquired authentication information (Act 51). If the authentication of the user fails (Act 51: No), the image forming apparatus 100 regularly repeats the processing in Act 51 to wait to receive new authentication information. If the authentication of the user succeeds (Act 51: Yes), the image forming apparatus 100 carries out an image forming processing according to the print job corresponding to the document ID associated with the authentication information (Act 52).

Modification of Embodiment

In the foregoing embodiment, a return instruction is sent from the wearable terminal 103 to the image forming apparatus 100. A structure in which a return instruction is sent from the beacon transmitter 104 to the image forming apparatus 100 is described below as a modification of the foregoing embodiment. The structure is capable of sending a return instruction even if a communication fault occurs because of the existence of a person or an object between the wearable terminal 103 and the image forming apparatus 100. Generally, the beacon transmitter 104 is arranged on a ceiling nearby the image forming apparatus 100 so as to facilitate the transmission of a beacon signal from the beacon transmitter 104 to each wearable terminal 103. Thus, the beacon transmitter 104 which can communicate well with the wearable terminal 103 can send a return instruction to the image forming apparatus 100.

Figure 5:
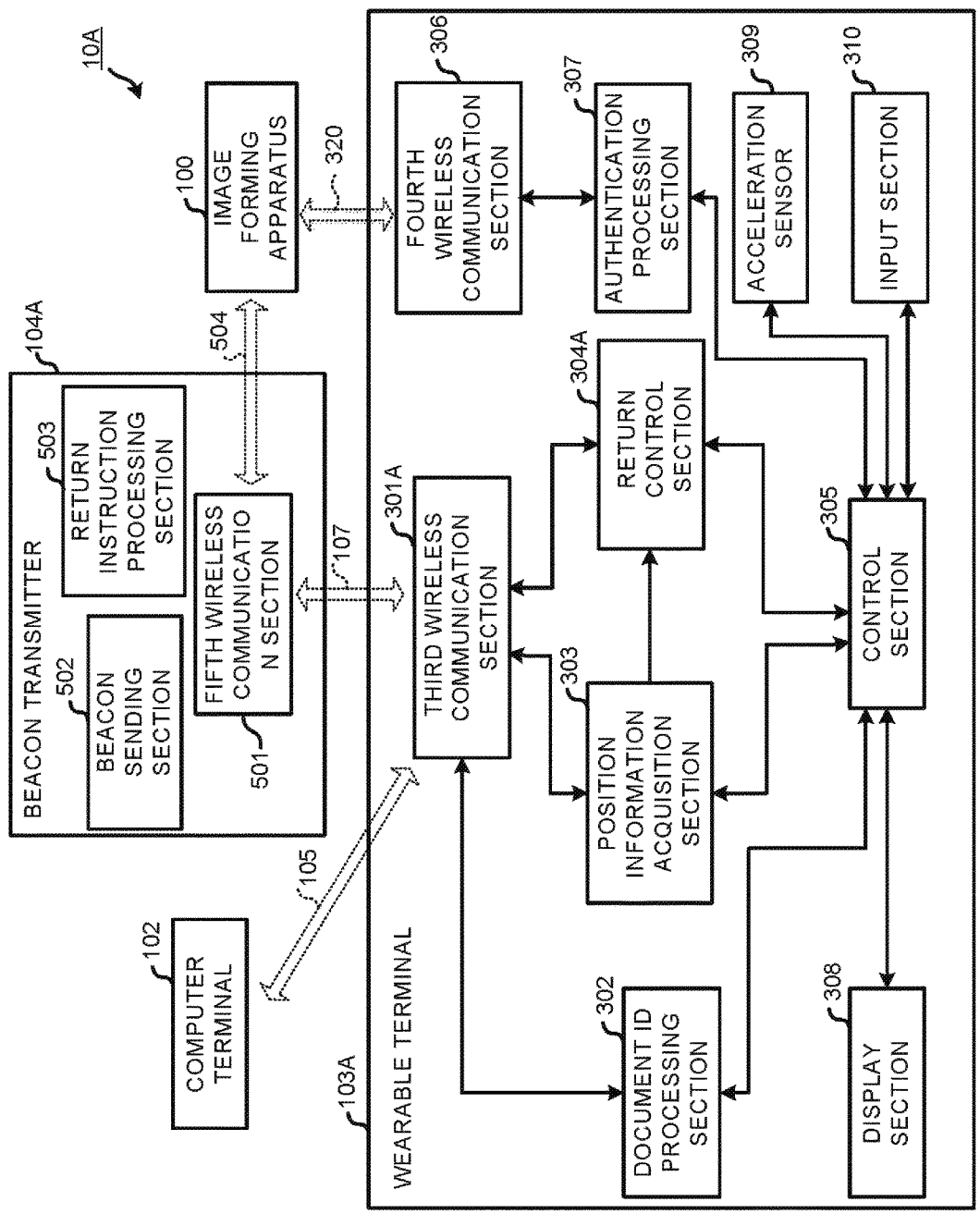
FIG. 5 is a diagram exemplifying the structure of an image forming apparatus control system 10A according to a modification of the embodiment.

FIG. 5 is a diagram exemplifying the structure of an image forming apparatus control system 10A according to the modification of the embodiment. The image forming apparatus control system 10A comprises an image forming apparatus 100, a network 101, a computer terminal 102, a wearable terminal 103A and beacon transmitters 104A. In FIG. 5 and FIG. 3, identical elements are denoted with the same reference symbols and are therefore not described repeatedly.

The wearable terminal 103A is different from the wearable terminal 103 shown in FIG. 3 in comprising a third wireless communication section 301A and a return control section 304A.

The third wireless communication section 301A sends a return instruction received from the return control section 304A to the beacon transmitter 104A. Different from the third wireless communication section 301 shown in FIG. 3, the third wireless communication section 301A conducts no wireless communication with the image forming apparatus 100. The return control section 304A sends the return instruction to the beacon transmitter 104A via the third wireless communication section 301A.

The beacon transmitter 104A comprises a fifth wireless communication section 501, a beacon sending section 502 and a return instruction processing section 503. The fifth wireless communication section 501 conducts first short distance wireless communication with the image forming apparatus 100 and the wearable terminal 103A. The fifth wireless communication section 501 receives the return instruction from the wearable terminal 103A. The beacon sending section 502 sends a beacon signal via the fifth wireless communication section 501. The return instruction processing section 503 acquires the return instruction received by the fifth wireless communication section 501 and sends the acquired return instruction to the image forming apparatus 100 via the fifth wireless communication section 501.

Figure 6:
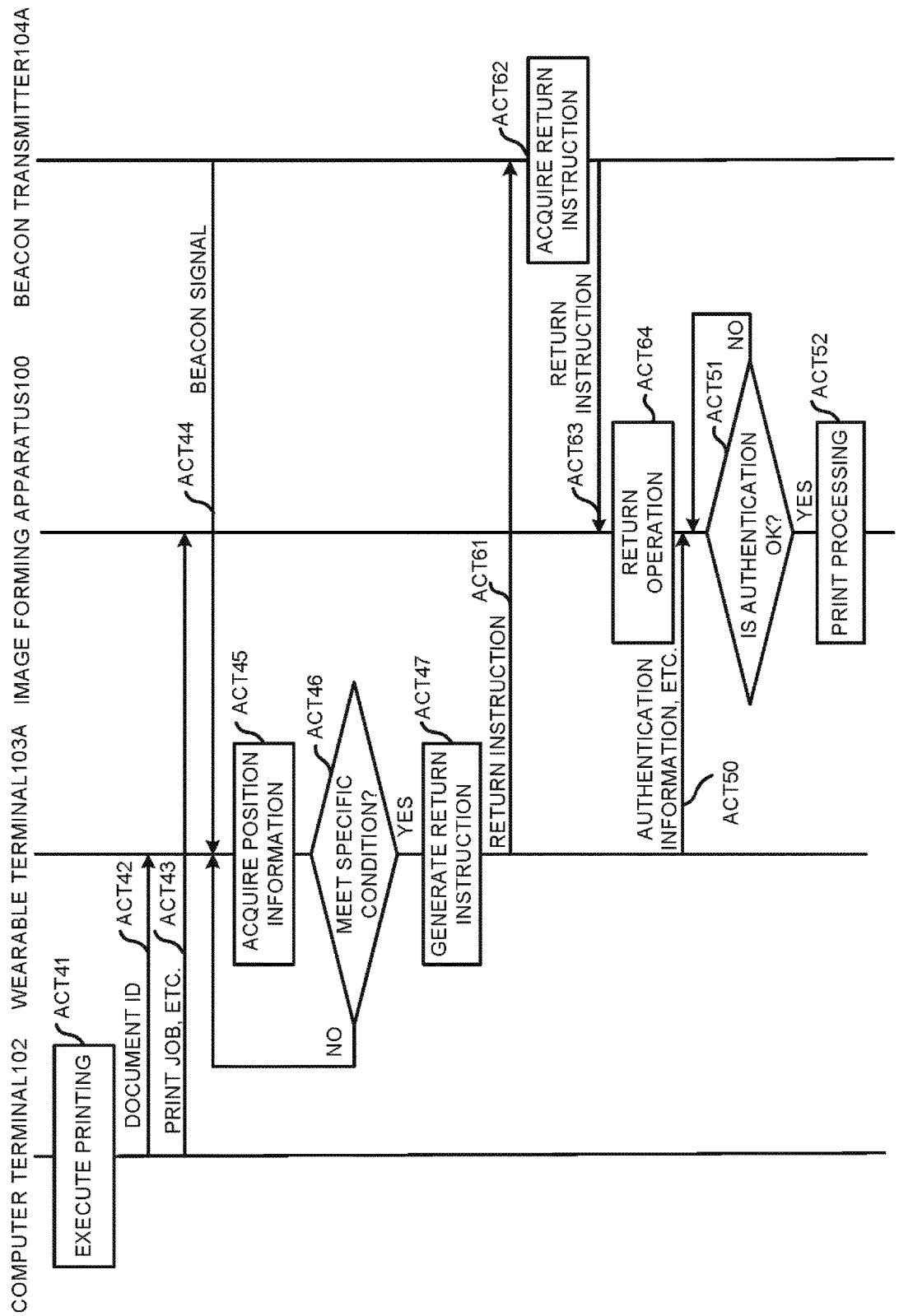
FIG. 6 is a flowchart exemplifying the operations of the image forming apparatus control system 10A according to the modification of the embodiment.

FIG. 6 is a flowchart exemplifying the operations of the image forming apparatus control system 10A according to the modification of the embodiment. Further, the precondition for the operations shown in FIG. 6 is that for the operations shown in FIG. 4. In the processing in FIG. 6 and FIG. 4, the same procedures are denoted with the same reference symbol and are therefore not described below repeatedly.

The wearable terminal 103A carries out the same processing in Act 41-Act 47 as the wearable terminal 103 in FIG. 4. Then, the wearable terminal 103A sends the generated return instruction to the beacon transmitter 104A (Act 61). In this way, the beacon transmitter 104A acquires the return instruction (Act 62). The beacon transmitter 104A sends the acquired return instruction to the image forming apparatus 100 (Act 63). The image forming apparatus 100 acquires the return instruction from the beacon transmitter 104A and changes the operation mode from a power-saving mode to a normal mode to carry out a return operation from the procedures (Act 64). Then, the image forming apparatus 100 carries out the processing in Act 50-Act 52 identical to that shown in FIG. 4.

The wearable terminal 103 is used in the foregoing embodiment; however, the present invention is not limited to this. The wearable terminal 103 can be replaced by a portable terminal which can communicate with the image forming apparatus 100, the computer terminal 102 and the beacon transmitter 104 through first short distance wireless communication and communicate with the image forming apparatus 100 through second short distance wireless communication. The first short distance wireless communication refers to a Bluetooth-based communication that is achievable within a distance of several to dozens of meters. The second short distance wireless communication refers to an NFC (Near Field Communication)-based communication that is achievable within a distance of about 10 centimeters.

According to at least one of the foregoing embodiments, the approach of a user to the image forming apparatus 100 can be detected highly accurately. Further, the wearable terminal 103 or 103A can acquire the position information only when a document ID is stored in the wearable terminal 103 or 103A. Thus, a user who does not carry out a print job can be ignored even if he/she approaches the image forming apparatus 100.

Further, the wearable terminal 103 can be always worn by the user. Thus, it is easier to carry and operate the wearable terminal 103 than to carry and operate an IC card in a case of carrying out a user authentication before execution of a print job. That is, it is needed to place an IC card in a pocket to carry the IC card and take the IC card out from the pocket at the time of the authentication. Contrarily, in a case of the wearable terminal 103 which is, for example, a wristwatch-type wearable terminal, authentication can be carried out only by holding the wearable terminal 103 over an MFP.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming method, comprising:
   sending a printing job from a computer terminal to an image forming apparatus;
   receiving, by an image forming apparatus, a printing job with a document ID issued from the computer terminal that specifies a print job sent from the computer terminal to the image forming apparatus;
   receiving, by a portable terminal, the document ID issued from the computer terminal, which is same as the document ID sent to the image forming apparatus from the computer terminal;
   sending a beacon signal for acquiring a position information of the portable terminal from the beacon transmitter to the portable terminal;
   if the position of the portable terminal having received the document ID and the image forming apparatus is within a predetermined distance, sending a return instruction to power each section in the image forming apparatus from the portable terminal to the image forming apparatus;
   sending authentication information associated with the document ID, which is sent from the computer terminal to the portable terminal, from the portable terminal to the image forming apparatus;
   authenticating at the image forming apparatus the authentication information;
   printing, by the image forming apparatus, the print job that is specified with the document ID associated with the authentication information which is authenticated by the image forming apparatus.

2. The image forming method according to claim 1,
   acquiring, by the portable terminal, the position information relating to a position of the portable terminal relative to the image forming apparatus based on beacon signal transmitted by the beacon transmitter.

3. The image forming method according to claim 2,
   sending, by the portable terminal, the return instruction based on the position information to the image forming apparatus.

4. The image forming method according to claim 1,
   sending, by the portable terminal, the return instruction to the beacon transmitter; and
   sending, by the beacon transmitter, the return instruction to the image forming apparatus.

5. The image forming method according to claim 1,
   if a vibration is detected by the portable terminal, sending, by the portable terminal, the document ID and the authentication information from the portable terminal to another portable terminal in which no document ID is stored.

* * * * *